(12) United States Patent
Doar et al.

(10) Patent No.: US 11,553,014 B2
(45) Date of Patent: Jan. 10, 2023

(54) DOWNLOADING OF SERVER-BASED CONTENT THROUGH PEER-TO-PEER NETWORKS

(71) Applicant: VMware, Inc., Palo Alto, CA (US)

(72) Inventors: Chen Doar, Herzliya (IL); Rami Stern, Herzliya (IL); Dima Golbert, Herzliya (IL); Or Lupovitz, Herzliya (IL); Lior Hipsh, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 578 days.

(21) Appl. No.: 15/641,261

(22) Filed: Jul. 4, 2017

(65) Prior Publication Data

US 2019/0014161 A1 Jan. 10, 2019

(51) Int. Cl.
*H04L 65/402* (2022.01)
*H04L 67/104* (2022.01)
*H04L 67/141* (2022.01)
*H04L 67/06* (2022.01)
*H04L 67/1074* (2022.01)
*H04L 67/01* (2022.01)

(52) U.S. Cl.
CPC .......... *H04L 65/4025* (2022.05); *H04L 67/01* (2022.05); *H04L 67/06* (2013.01); *H04L 67/104* (2013.01); *H04L 67/108* (2013.01); *H04L 67/141* (2013.01)

(58) Field of Classification Search
CPC ... H04L 65/4023; H04L 67/06; H04L 67/104; H04L 67/141
See application file for complete search history.

(56) References Cited

U.S. PATENT DOCUMENTS

| | | | | |
|---|---|---|---|---|
| 8,169,916 | B1* | 5/2012 | Pai ..................... | H04N 21/2181 709/200 |
| 2006/0080454 | A1* | 4/2006 | Li ........................ | H04L 67/1019 709/231 |
| 2006/0212542 | A1* | 9/2006 | Fang ..................... | H04L 67/104 709/219 |
| 2006/0212584 | A1* | 9/2006 | Yu ........................ | H04L 67/104 709/227 |
| 2007/0050761 | A1* | 3/2007 | Hester .................. | H04L 67/104 717/168 |
| 2007/0244894 | A1* | 10/2007 | St. Jacques ........... | H04L 67/104 |
| 2009/0094347 | A1* | 4/2009 | Ting ..................... | H04L 67/104 709/219 |
| 2010/0146138 | A1* | 6/2010 | Ng ........................ | H04L 67/108 709/231 |
| 2011/0072075 | A1* | 3/2011 | Gautier ............... | H04L 12/1881 709/203 |

(Continued)

*Primary Examiner* — Hitesh Patel
*Assistant Examiner* — Sujana Khakural (57) ABSTRACT

A system is described for downloading server-based content to peers in a P2P network. The server-based content can be partitioned and different peers can be given priority for downloading the different parts. A client on each peer can view what content is available on each of the other peers as well as what content is available on a virtual peer, which represents content on the server and only makes content that exists on the server and not on any peers available for download. Consequently, a client on a peer requesting to download the content can download the content from the peers and the virtual peer based on a file sharing protocol, such as BitTorrent.

20 Claims, 4 Drawing Sheets

(56) References Cited

U.S. PATENT DOCUMENTS

| | | | | |
|---|---|---|---|---|
| 2011/0125849 A1* | 5/2011 | Boyd | .................... | H04L 63/123 |
| | | | | 709/204 |
| 2011/0131278 A1* | 6/2011 | Nieh | ................... | H04L 67/1082 |
| | | | | 709/204 |
| 2014/0122658 A1* | 5/2014 | Haeger | ............... | H04L 67/1095 |
| | | | | 709/219 |
| 2014/0136644 A1* | 5/2014 | Tuononen | ........... | H04L 67/2852 |
| | | | | 709/213 |
| 2014/0156687 A1* | 6/2014 | Chen | ................... | G06F 16/9558 |
| | | | | 707/E17.014 |

\* cited by examiner

DOWNLOADING OF SERVER-BASED CONTENT THROUGH PEER-TO-PEER NETWORKS

TECHNICAL FIELD

The present disclosure generally relates to techniques for data sharing in peer-to-peer networks and more specifically to techniques for downloading server-based content via multiple peers.

BACKGROUND

In a typical peer-to-peer (P2P) network, multiple computing devices, or "peers", are connected over the network in a way that allows the peers to share various resources among themselves. For example, in this architecture a peer that requests certain content, such as a file, can download the content from one or more peers on the network instead of from a server. Generally, in such networks a client application operates on each peer to enable the sharing of resources among the peers. Each client may operate based on a protocol, such as BitTorrent, which allows the peer to download different parts of a file from other peers and combine the downloaded parts to reproduce the file.

This approach offers several advantages over traditional server-based infrastructures. For example, with P2P networking, a peer can access information available on multiple peers, not just information that is available on a server. Also, data transfer may be performed more efficiently because it can utilize local networks and the flow of data can be distributed among multiple peers instead of being centralized on a server, which can contribute to faster download speeds, decreased network costs, and reduced server crowding.

P2P networks are sometimes used to improve the efficiency of data transfer within the organization and to reduce associated network costs. For example, computing devices in an enterprise may be connected over a high efficiency local network to produce a P2P network over which content can be distributed and shared throughout the enterprise.

However, not all data transfer scenarios are good candidates for traditional P2P networking topologies. In certain situations, it can also be important to provide a single central server or location that contains a copy of all data shared amongst the totality of the peers. For example, in many enterprise deployments, it is important that all the data contained on any single employee device is also backed up to a single data store or backup server. Such centralized backup data may then be used to restore a device in case of failures. Similarly, a central administrative server may be utilized for managing employee devices and distributing applications and other data to such devices. For example, an administrator may provision an employee's device by remotely adding the necessary software on the device to make the device ready for use. Such enterprise deployments may still benefit from certain P2P data transfer techniques that improve efficiency and lessen the overall load on the central server if the data is available on a peer device. However, if a file exists on a central server but not on any peers, a peer may not be able to leverage the P2P network to perform the download. Instead, the file may need to be requested directly from the sever. Particularly in cases where multiple peers request the same content from the server at the same time, problems of network congestion and server crowding can arise. The issues are exacerbated when the requested content is large. Furthermore, the transfer of large amounts of data from the remote server as a result of multiple peers downloading the same server-based content can involve associated network costs.

A more efficient approach is desirable for downloading server-based content via P2P networks.

DETAILED DESCRIPTION

Systems and methods in accordance with various embodiments of the present disclosure overcome at least some of the above-mentioned shortcomings and deficiencies by providing more efficient ways to download content located on a single central server to computing devices in a P2P network. In particular, embodiments described herein provide systems and method for efficiently transferring portions of server-based content to different peers in the P2P network, such that any peer can subsequently download the entire content by obtaining parts from other peers, without needing to access the server.

In a typical scenario, peers in a P2P network may be connected by a LAN (Local Area Network), and the server may be accessible by the peers via a WAN (Wide Area Network), such as the Internet. For example, the peers may be computing devices located in an enterprise connected to each other over a local ("on-premises") network in the enterprise, and each peer may have Internet access to a server located in a remote data center. Transfer of data between peers may be performed quickly, efficiently, and with low cost to the enterprise by utilizing the local network. Transfer of data between the server and the peers, on the other hand, may be less efficient and more costly because it is performed over the Internet connection.

To improve efficiency and reduce costs of data transfer, enterprises may employ systems and protocols that allow endpoints within the enterprise to obtain data over local networks instead of via servers, such as P2P file sharing systems and protocols. Various P2P file sharing systems and protocols are commercially available and well known in the field. Such systems and protocols may operate by allowing each device or "peer" in the P2P network to discover what content (such as files, applications, etc.) is available on other peers and download the content directly from the other peers. One particular example of a P2P file sharing protocol is the BitTorrent protocol.

With BitTorrent, computing devices connected by a network and running the BitTorrent client become peers. When content (e.g., file, application, etc.) is requested by a peer, a "swarm" is identified, which is the peers that have all or a portion of the content and are in the process of sending or receiving it (peers that are in the process of downloading the file will have portions of it). To identify the swarm, the client may communicate with a server (called a tracker) that finds peers with the complete or partial content, or that are in the process of sending or receiving it. The peer then begins receiving pieces of the content from different peers in the swarm simultaneously. Pieces are typically downloaded non-sequentially and are rearranged into the correct order by the BitTorrent client, which monitors which pieces it needs, and which pieces it has and can upload to other peers. As the peer receives a new piece of the content, it becomes a source of that piece for other peers in the swarm requesting that content. Once the entire content is downloaded to the peer, the peer can remain in the swarm and continue serving as a source of the content for other peers in the swarm requesting that content.

In various embodiments, a P2P file sharing protocol such as BitTorrent, may be modified with the techniques described herein to account for a topology that includes a single central server containing all data across the totality of all peers. In other embodiments, different applicable protocols and systems may be implemented to practice the techniques described herein, which protocols and systems may be previously existing or newly developed and used with the invention.

In various embodiments, in order for a peer to be able to download content from the P2P network, a complete copy of the content needs to be available on at least one peer. In cases where a copy of the content is not available on any peers but only on a server, the peers may need to download the content from the server. However, as discussed above, the server connection may be inefficient and costly. Further, when numerous peers attempt to access the server simultaneously, overcrowding of the server may result.

For example, such a situation may be encountered when an administrator attempts to deploy a server-stored application to numerous endpoints in the enterprise. Once the application is assigned to the multiple endpoints, each endpoint may simultaneously attempt to download the application from the server, which can cause overcrowding of the server. Also, particularly in cases where the application is considerably large, the enterprise may incur significant costs due large data transfers from the remote server to the endpoints.

To address such situations, embodiments described herein provide more efficient ways to download server-based content to peers in P2P networks, leveraging P2P file sharing capabilities. The process can begin by receiving a request to download the server-based content to computing devices in a P2P network. In response to the request, the content can be divided into multiple portions and each portion can be downloaded to a different peer, or different peers can be given priority for downloading different portions. A client application running on each peer can determine what portions of the content are available on each of the other peers and what content is available on the server. Consequently, to download the content to a peer, the client can download portions of the content available on other peers from such peers and only retrieve portions from the server if those portions are not available on any peers.

In this way, once a portion of the server-based content is downloaded to a peer, other peers may no longer need to access the server to obtain such portion and can instead obtain the portion from the peer, and other peers can subsequently obtain the content from those peers. As a result, the transfer of data from the server is minimized because once a piece of content is downloaded to one or more peers, other peers no longer need to access the server to obtain that piece, provided that at least one peer containing the piece is available and remains online.

In a preferred embodiment, the system can be implemented by introducing the concept of a virtual peer. The virtual peer can appear to each peer's client as another peer on the network that represents content on the central server. When a client downloads content from the virtual peer, the content would be downloaded from the server. Hence, a peer's client can download content using the same framework as in normal P2P file sharing except now with the addition of the virtual peer. The virtual peer can be treated by each client in the same way as any other peer, with the exception that content would be downloaded from the virtual peer only in the event that the content is not available on any other peers. For example, the virtual peer can be configured to mark content that is not available on any other peer as "available", and to mark content that is available on other peers as "missing". This way, content may be downloaded from the virtual peer (i.e., the server) only in the case that it is not available on any other peers, thus minimizing server access.

Hence, in embodiments utilizing virtual peers, server-based content can be partitioned and different peers can be given priority for downloading the different parts of the content. The client on each peer can then view what content is available on each of the other peers as well as what content is available on the virtual peer, which marks content that exists on the server and not on any peers as "available" and content that exists on any peers as "missing". Consequently, a client on a peer requesting to download the content can download the content from the peers and the virtual peer.

Figure 1:
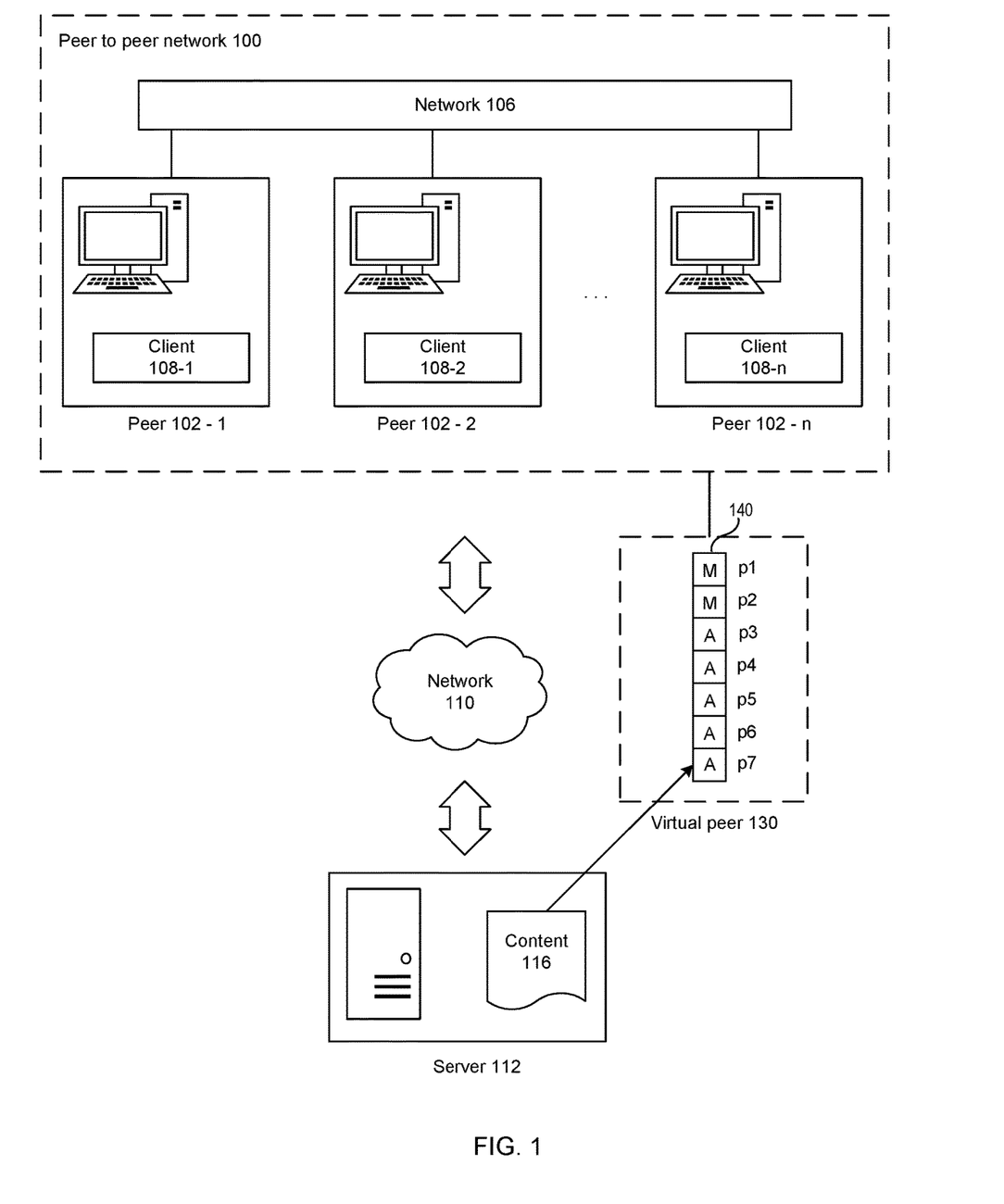
FIG. 1 illustrates an example of a system for downloading server-based content to a P2P network, in accordance with various embodiments.

FIG. 1 illustrates an example of a system for downloading server-based content to a P2P network, in accordance with various embodiments. As illustrated in the example of FIG. 1, a P2P network 100 can include peers 102-1, 102-2, through 102-n. The P2P network 100 can include any number of peers (e.g., tens, hundreds, thousands, etc.). A peer (e.g., 102-1, 102-2, through 102-n) may be any type of computing device, such as a laptop, desktop computer, smartphone, tablet, and so on. The peers (102-1, 102-2, through 102-n) may be connected by any type of network (106) allowing the peers to communicate and exchange information with each other. In an ideal embodiment, the network 106 would be an efficient and low cost network, such as a LAN in an enterprise.

Each peer (102-1, 102-2, through 102-n) can contain a client application (108-1, 108-2, through 108-n) executing thereon that performs functions such as coordinating data sharing between the peers, as described further below. In various embodiments, a client (e.g., 108-1, 108-2, through 108-n) can implement a modified file sharing protocol to perform various features described herein.

The example of FIG. 1 also includes a server 112, which may be located in a data center. Each peer (102-1, 102-2, through 102-n) may be able to communicate with the server over a network 110. The network 110 may be a less efficient and more costly network than network 106, such as the Internet. The server 112 contains content 116, which may be a file, a program, or any other set of electronic content that may be requested by one or more peers (102-1, 102-2, through 102-n). For example, users of peers (102-1, 102-2, through 102-n) may request to download the content 116 or an IT administrator may assign the content 116 (which may be in this case an application) to the peers (102-1, 102-2, through 102-n).

In various embodiments, the client (e.g., 108-1, 108-2, through 108-n) can receive the request to download the content 116. In response to the request, the client (e.g., 108-1, 108-2, through 108-n) can discover which peers (e.g., 102-1, 102-2, through 102-n) in the P2P network 100 contain portions of the content 116 and what portions of the content 116 the peers (102-1, 102-2, through 102-n) have. Various known P2P file sharing systems and protocols provide a framework for discovering what content is available on other peers in P2P networks and the details of the discovery process are not discussed in detail herein so as not to obscure the salient points of the invention.

After discovering which peers (102-1, 102-2, through 102-n) contain parts of the content 116, the client (e.g., 108-1, 108-2, through 108-n) can download portions of the content 116 available on the other peers (102-1, 102-2, through 102-n) from such peers. Various known P2P file sharing systems and protocols provide a framework for separating content into portions and downloading the portions from multiple peers in a P2P network environment, and the details of the process are not discussed in detail herein so as not to obscure the salient points of the invention.

In various embodiments, if any portions of content 116 are not available on the peers (102-1, 102-2, through 102-n), then the client (108-1, 108-2, through 108-n) can download those portions from the server 112. For example, this can be performed by creating a virtual peer 130 representing the server 112. The virtual peer 130 can appear to each client (e.g., 108-1, 108-2, through 108-n) as another peer in the P2P network 100 containing portions of the content 116, while the virtual peer 130 actually represents the server 112. To obtain a part of the content 116 from the virtual peer 130, a client (108-1, 108-2, through 108-n) can download the part from the server 112. However, to prevent clients (108-1, 108-2, through 108-n) from downloading parts of content 116 from the server 112 when such parts are available on the P2P network 100 (i.e., on a peer (e.g., 102-1, 102-2, through 102-n)), the virtual peer 130 can be configured to mark parts of content 116 as "available", only when such parts are not available on the network 100. Parts that are available on the network 100 can be marked as "missing".

For example, the virtual peer 130 in the example of FIG. 1 displays parts 140 of the content 116. In this case, the content 116 has been divided into seven parts 140, p1 through p7. In the virtual peer 130, parts p1 and p2 are marked with the letter "M", to signify that those parts are missing because those parts are available in the P2P network 100. That is, parts p1 and p2 of the content 116 are available on one of the peers 102-1, 102-2, through 102-n. Parts p3 through p7, however, are marked with the letter "A", to signify that those parts are available, because those parts are not available in the P2P network 100. That is, parts p3 through p7 of the content 116 are not available on any of the peers 102-1, 102-2, through 102-n.

Thus, with this framework, each peer's client (108-1, 108-2, through 108-n) can view the portions of content 116 available on other peers (102-1, 102-2, through 102-n), and it can view the portions of content 116 not available on any peers but available on the server 112 via the virtual peer 130. Then, the client (108-1, 108-2, through 108-n) can download the content 116 by obtaining portions from other peers (108-1, 108-2, through 108-n) and from the server 112 (via the virtual peer 130). In various embodiments, because the virtual peer 130 can appear as a regular peer, the clients (108-1, 108-2, through 108-n) can perform the downloading of content 116 from other peers and from the server 112, as well as share downloaded portions of content 116 with other peers (e.g., 102-1, 102-2, through 102-n).

Figure 2A:
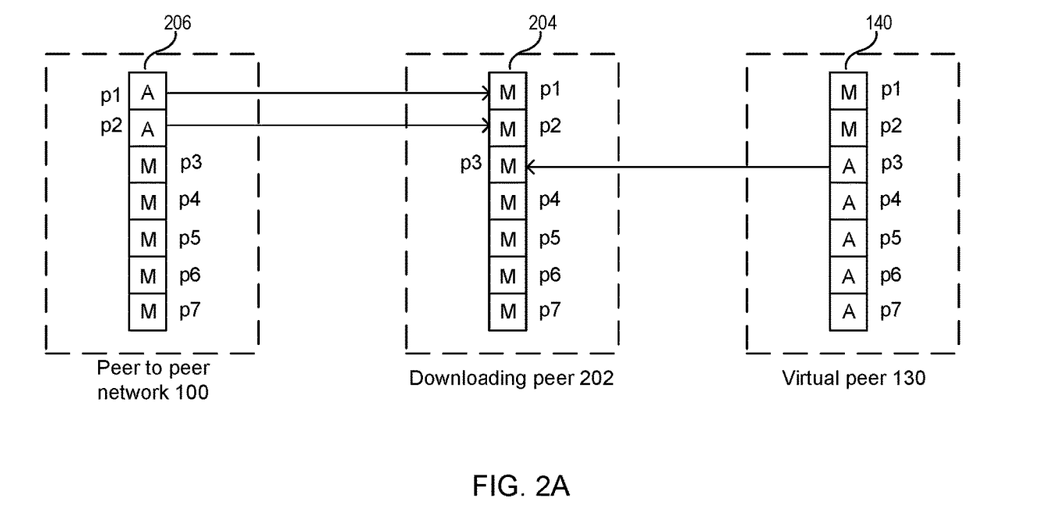
FIG. 2A illustrates an example first step of a peer downloading portions of content from the P2P network and from the virtual peer, in accordance with various embodiments.

FIG. 2A illustrates an example first step of a peer downloading portions of content from the P2P network and from the virtual peer, in accordance with various embodiments. The example of FIG. 2A illustrates a downloading peer 202, which can be any peer in the P2P network 100 that has requested to download the content 116. That is, the downloading peer 202 can be any of peers 102-1, 102-2, through 102-n. To download the content, the client (e.g., 108-1, 108-2, through 108-n) of the downloading peer 202 discovers what portions of the content are available on the virtual peer 130 and what portions of the content are available on other peers on the network 100. FIG. 2A illustrates an example of such available portions of content 116 in the virtual peer 130 and in other peers in the P2P network 100.

As illustrated in the example, the content 116 includes seven portions, p1 through p7. A diagram 206, 204, 140 representing portions of content are illustrated in the P2P network 100, the downloading peer 202, and the virtual peer 140, respectively, to illustrate by way of example portions of content 116 that might be available or missing in each of the network 100, the downloading peer 202, and the virtual peer, respectively. The letter "A" in a corresponding portion of content indicates that the portion is available in the location. The letter "M" in a corresponding portion of content indicates that the portion is missing in the location. For example, in the downloading peer 202, all portions are marked "M", indicating that all portions of the content 116 are missing (e.g., because the downloading peer 202 has just begun the download process and no portions of the content 116 have yet been transferred).

In the P2P network 100, parts p1 and p2 are marked with the letter "A", to signify that those parts are available in the network 100. That is, parts p1 and p2 are available on at least one of the peers 102-1, 102-2, through 102-n. For example, those parts may have been already downloaded by some peers 102-1, 102-2, through 102-n from the server 112. Parts p3 through p7, however, are marked with the letter "M", to signify that those parts are missing in the P2P network 100. That is, parts p3 through p7 of the content 116 are not available on any of the peers 102-1, 102-2, through 102-n.

In the virtual peer 130, parts p1 and p2 are marked with the letter "M", indicating that those parts are missing. In the case of the virtual peer 130, those parts may actually be present on the server 112, however they can be marked as "missing" because those parts are available in the P2P network 100 (in order to prevent peers from downloading these parts from the server 112, since they are available on the peer network 100). Parts p3 through p7, however, are marked with the letter "A", to signify that those parts are available, because those parts are not available in the P2P network 100. That is, parts p3 through p7 of the content 116 are not available on any of the peers 102-1, 102-2, through 102-n The client of the downloading peer 202, when requested to download the content 116, would see the available portions 206 on the network 100 and the available portions 140 on the virtual peer 130 and begin to download the portions that it needs (i.e., portions missing on the peer 202) from the virtual peer 130 and from peers in the network 100. As illustrated, the downloading peer 202 can obtain portions p1 and p2 by downloading them from peers in the P2P network 100 and portion p3 from the virtual peer (by downloading it from the server 112). As mentioned, the virtual peer 130 may appear to the client of the downloading peer 202 as just another peer in the P2P network 100. Hence, the client may operate according to any file sharing protocol, such as BitTorrent, to perform the functions of discovering portions of content on the P2P network 100 and virtual peer 130, and to coordinate the download of parts from the virtual peer 130 and from the network 100.

Figure 2B:
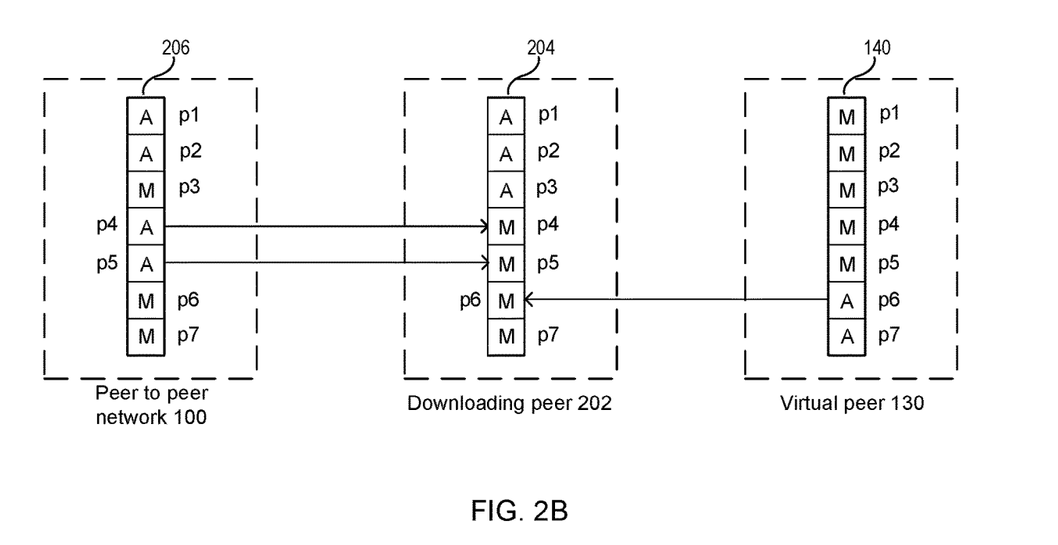
FIG. 2B illustrates an example second step of a peer downloading portions of content from the P2P network and from the virtual peer, in accordance with various embodiments.

FIG. 2B illustrates an example second step of a peer downloading portions of content from the P2P network and from the virtual peer, in accordance with various embodiments. As illustrated in the example of FIG. 2B, the downloading peer 202 now has a parts p1 through p3 of the content, which where were downloaded to the peer 202 in the first step as illustrated in FIG. 2A.

The P2P network 100, still has parts p1 and p2, as it did previously, but now it also has parts p4 and p5, indicating that there are now some peers in the network (e.g., 102-1, 102-2, through 102-n) that have parts p4 and p5. This could happen, for example, if peers that have parts p4 and p5, which were not previously online, have now come online. Also, with some protocols, such as BitTorrent, as soon as a peer downloads a part of content, that part can become available for other peers to download. Hence, parts p4 and p5 may have been downloaded by some peers (e.g., 102-1, 102-2, through 102-n) in the network 100 (e.g., from the server 112) and are now available for peer 202 to download.

The virtual peer 130 shows parts p1, p2, p3, p4, and p5 as missing (because those parts are available on the network 100 and the downloading peer 202) and parts p6 and p7 as available (because those parts are not available on the network).

The client of the downloading peer 202 can again view the available portions 206 on the network 100 and the available portions 140 on the virtual peer 130 and download the portions that it needs (i.e., missing portions p4 through p7) from the virtual peer 130 and from peers in the network 100. As illustrated, the downloading peer 202 can obtain portions p4 and p5 by downloading them from peers in the P2P network 100 and portion p6 from the virtual peer 130 (by downloading it from the server 112).

As illustrated in FIGS. 2A and 2B, in this way, as available content on the peer network 100 continues to change (e.g., due to peers downloading content from the server or peers coming on- or off-line), the system can update the available content on the virtual peer 130 accordingly, such that content might only be downloaded from the server 112 when it is not available on the peer network 100.

As mentioned previously, one of the advantages of the described invention is in reducing data transfer and simultaneous requests on servers (e.g., 112). However, even with a system where a downloading peer only requests content from the server when the content is not available on any peers, issues such as server overcrowding and downloading of the same data by peers may be encountered when a particular part of the content is not available on any peers and multiple downloading peers simultaneously request this same portion of content from the server. For example, this may be the case where multiple peers begin downloading new content and all the peers simultaneously request the first portion of content from the server.

In various embodiments, to address such issues, peers downloading content from the server can be assigned different priority for downloading specific portions of content that is only available on the server (or content that is displayed in the virtual peer). This may prevent multiple peers from downloading the same portions of the content at the same time. The download priority can be distributed so that different peers download different portions of the server-only content. Once the parts of the content are downloaded from the server to different peers, a peers may no longer request those parts from the server because those parts will be available on other peers (a virtual peer may make those parts unavailable once they are available on the peers).

In various embodiments, when a peer is assigned priority for a specific part of the content, the peer can be made to begin the process of downloading the content by downloading that specific part. For example, download priority can be assigned to a particular peer by making the peer begin the content download process by download certain portions of the server-only content (or content displayed in a virtual peer). In various embodiments, download priority can be assigned to a particular peer by making the peer download certain portions of the server-only content (or content displayed in a virtual peer) before it downloads any other portions of the server-only content. In these cases, different peers may be assigned priority for different portions of the server-only content, in order to limit the number of peers downloading the same content simultaneously. This way, when different peers are assigned priority for different parts of the server-only content (content on the virtual peer), the amount of duplicate content that is downloaded to the P2P network from the server (and the likelihood of server overcrowding) can be reduced.

In various embodiments, assigning download priority to peers for particular parts of content may be achieved in a variety of different ways. For example, when a peer is given priority over a certain portion, other peers may be prevented from downloading that portion from the server.

In various embodiments, download priority can be assigned to peers by sequentially dividing the content and assigning different portions to different peers. For example, when a certain number of peers request to download content that is only available on the server (or content that is available on the virtual peer), the content can be divided into a number of portions equal to the number of peers, and each portion can be assigned to a different peer for prioritized download. The content can be divided into equal parts and each part can be assigned to a different peer (if the content cannot be divided equally, then the remainder can also be assigned to a particular peer).

For example, the priority for parts of a certain set of content can be assigned as follows: First, the content can be separated into chunks, which may be units of data that will make up the parts assigned to the peers. The method for separating the content into chunks may be the same method as used in the system (e.g., by the file sharing protocol) for separating content. Namely, the file sharing system has to split files in order to enable downloading and uploading of parts of content between different peers, which may be performed using a chunking method. This same chunking method may be implemented in this step.

Various chunking functions can be used for separating the content into chunks. For example, the BitTorrent protocol splits content into chunks of a fixed size. Other chunking functions, such as Rabin fingerprinting, may also be used. What is important is that the chunking function used provides the same split for the same set of content (e.g., so that peers can send and receive chunks knowing their exact location in the content).

The chunks of content can be represented by what is referred to as the bit field. Hence, the bit field can represent the sequence of chunks that make up the content. For example, the chunks can be numbered: chunk0=0, chunk1=1 . . . chunkN=N, and so on. The bit field length is the number of chunks, and if the value of the bit in the $n^{th}$ place is 1, then the chunk is present; if it is 0, then the chunk is not present.

In the following example, content is separated into seven chunks, hence then the bit field can represent the seven chunks. In this case, the bit field size is 7. Further, the notation "Bitfield[n]" refers to the $n^{th}$ chunk. Hence, Bitfield[0] refers to chunk number 0 (numbering of chunks starts with zero), Bitfield[1] refers to chunk number 1, and so on.

Content can be separated into parts using the following process:

Step 1: Sort the peers (peers can be sorted by name, IP address, or any other identifying characteristic). Index i=the index of the peer in the list of peers. The first peer has an index i of zero.

Step 2: Define a size "x", indicating the number of chunks in the equal portions of content. x=bit field size/number of downloading peers. Also define a size "r", indicating the number of chunks in any remainder when calculating x.

Step 3: Define the range of the bit field assigned to each peer (this defines the chunks of the content from which the peer will prioritize download (e.g., chunks from which the peer will start the download)):

For peers where i<(number of peers)−1:
  Peer(i) will be assigned chunks in the range from Bitfield[(x*i)] to Bitfield[(x*(i+1)−1]
For peers where i=(number of peers)−1
  Peer(i) will be assigned the chunks in the range from Bitfield[(x*i)] to Bitfield[(x*(i+1)−1+r]

To illustrate an example, assume content has bit field size 7 (content is separated into 7 chunks) and there are two downloading peers (e.g., peers with IP addresses ip1: 10.0.0.1 and ip2:10.0.0.2). Peer 1 index i1=0; and Peer 2 index i2=1. In this case, x=3, because 7/2=3; and r=1, because Remainder(7/3)=1. Then:

For Peer 1:
  Peer 1 (i1=0) will be assigned chunks in the range from Bitfield[(3*0)] to Bitfield [(3*(0+1)−1]. That is, Bitfield[0] to Bitfield[2]. Hence, the first portion contains chunks 0, 1, 2. Peer 1 can be assigned these chunks for prioritized download.
For Peer 2:
  Peer 2 (i2=1) will be assigned chunks in the range from Bitfield[(3*1)] to Bitfield [(3*(1+1)−1+1]. That is, Bitfield[3] to Bitfield[6]. Hence, the second portion contains chunks 3, 4, 5, 6. Peer 2 can be assigned these chunks for prioritized download.

Further, if a peer is added to or removed from the peer list (e.g., another peer requests to download the content or one of the downloading peers stops downloading), the procedure can be repeated to re-distribute download priority. Returning to our example, assume that another peer (e.g., ip: 1.0.0.3) is added. In this case, x=2; r=1; i1=0; i2=1; i3=2. Then: Pier 1 will be assigned chunks 0, 1; peer 2 will be assigned chunks 2, 3; and peer 3 will be assigned chunks 4, 5, 6. Consequently, if peer 1 is removed, then x=3; r=1; i2=0 and i3=1. Then: peer 2 will be assigned chunks 0, 1, 2; and peer 3 will be assigned chunks 3, 4, 5, 6.

In various embodiments, download priority for parts of the content can be assigned to peers randomly. For example, each peer can select the pieces or chunks to download from the virtual peer at random, with unified distribution. This approach may result in some peers downloading the same data from the server as others, however, particularly in cases where the bit field is large, the rate of redundant downloads may be low.

For example, to distribute priority randomly, the content (e.g., content on the virtual peer) can be divided into chunks and the chunks can be assigned randomly to different peers. Alternatively, sets of chunks can be distributed randomly.

For example, sets of a given number of sequenced chunks can be randomly selected from the bit field and assigned to different peers.

In an embodiment, the bit field size can be divided by the number of peers requesting the content to determine how many chunks to include in each portion. Then, portions containing sequences of the determined number of chunks can be randomly chosen from the bit field and assigned to different peers.

In some cases where the content being downloaded from the server (e.g., content on the virtual peer) is small enough, e.g., smaller than a particular predetermined limit or threshold, it may not make sense to break the content up into portions for downloading (e.g., because breaking up the content and downloading it piece by piece imposes a certain amount of overhead). In these cases, the system can be configured for the peers to download the entire content instead of splitting it. For example, the system can determine whether a set of content requested by a peer is smaller than a certain predetermined threshold. Then, if the set is smaller than the threshold, the entire content can be requested for download by the peer. If, on the other hand, the content is larger than the threshold, then the content can be downloaded to the peer in sequential pieces.

Figure 3:
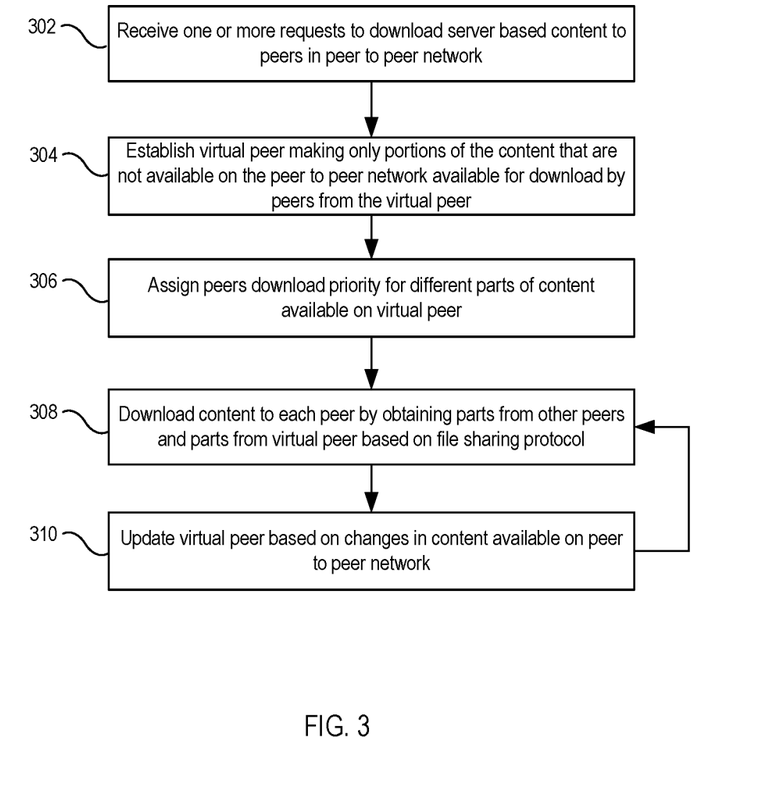
FIG. 3 illustrates an example process flow for downloading server-based content to peers in a P2P network, in accordance with various embodiments.

FIG. 3 illustrates an example process flow for downloading server-based content to peers in a P2P network, in accordance with various embodiments. As illustrated, in operation 302, one or more requests to download server-based content to peers in a P2P network can be received. In operation 304, a virtual peer can be established that makes portions of the server-based content that are not available on the P2P network available for download by the peers from the virtual peer. As described previously, a client on each peer may be able to discover what parts of the contents are available on each of the other peers as well as on the virtual peer (which can appear to a client as another peer on the network). Content downloaded by a peer from the virtual peer can be downloaded to the peer directly from the server. In operation 306, the peers can be assigned download priority for different parts of the content that is available on the peer. For example, the download priority of a peer can indicate what part of the content that is available on the virtual peer, the peer will download first. Different peers may be assigned priority for different portions of the content (e.g., assigned in sequence or at random), to limit the downloading of the same content by multiple peers. In operation 308, each peer can download the server-based content by obtaining parts from other peers (when and if available on the other peers) and parts from virtual peer. In operation 310, the virtual peer can be updated based on changes in content available on the P2P network. For example, as peers download parts of content from the virtual peer (from the server), the downloaded parts become available for other peers to download from those peers; accordingly, those parts can be removed from the virtual peer. Also, as new peers come online in the network or existing peers are removed, the parts of content available on the P2P network may change and the virtual peer can be updated accordingly. Consequently, the process can return to operation 308, where the peers continue to download the content by obtaining parts from the network and from the virtual peer.

Figure 4:
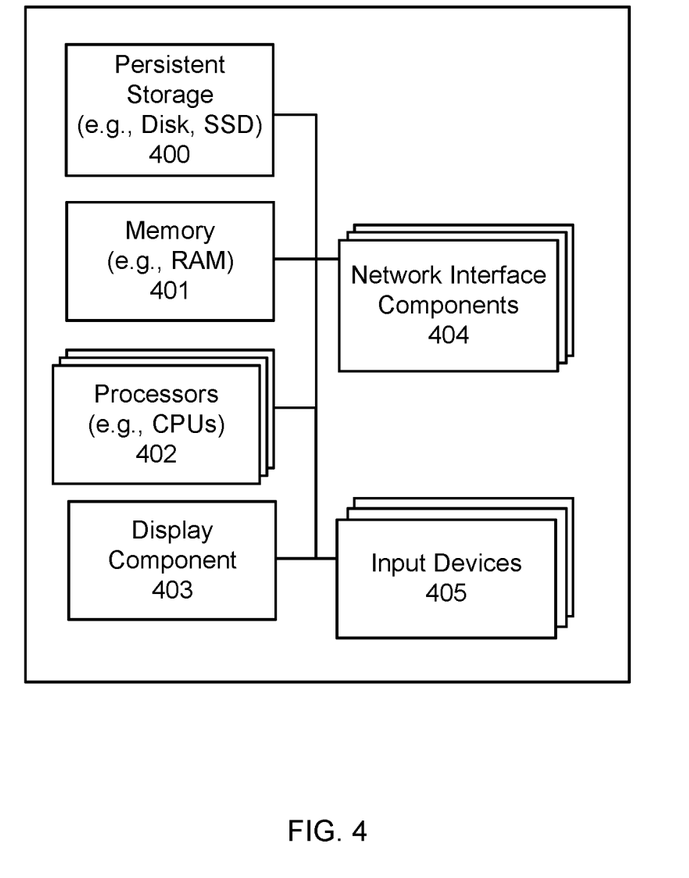
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for downloading content located on a central server to a target peer in a peer-to-peer network, each peer comprising a computing device containing a client executing thereon for enabling sharing of content among the peers according to a peer-to-peer file sharing protocol, the method comprising:
identifying peers in the peer-to-peer network containing portions of the content;
establishing a virtual peer, the virtual peer appearing as an additional peer in the peer-to-peer network, wherein the virtual peer is configured such that when a particular peer downloads data from the virtual peer, the data is conveyed from the server to the particular peer;
identifying portions of the content that are unavailable on all peers but are available on the server;

marking the identified unavailable portions of the content as available on the virtual peer;
marking portions of the content that are available on any peers as missing on the virtual peer; and
downloading the content to the target peer from the identified peers and the virtual peer based on the peer-to-peer file sharing protocol by obtaining portions of the content available on the identified peers from the identified peers and portions of the content available on the virtual peer from the central server.

2. The method of claim 1, further comprising:
identifying one or more additional peers requesting to download the content;
determining a plurality of parts of the unavailable portions of the content; and
downloading from the virtual peer a different part of the plurality of parts to each of the requesting peers in the peer-to-peer network.

3. The method of claim 2, wherein the plurality of parts are determined by sequentially dividing the unavailable portions of the content into parts of a number of consecutive chunks.

4. The method of claim 2, wherein the plurality of parts are determined by randomly selecting parts of a number of consecutive chunks from the unavailable portions of the content.

5. The method of claim 1, further comprising:
determining that additional portions of the content have become available on the peers in the peer-to-peer network; and
in response, marking the additional portions of the content as missing on the virtual peer, such that the virtual peer makes available for download only the portions of the content that are available on the central server and not available on any other peer in the peer-to-peer network.

6. The method of claim 5, further comprising:
implementing the BitTorrent peer-to-peer file sharing protocol to download the content to the target peer from the peers in the peer-to-peer network and from the virtual peer.

7. The method of claim 1, further comprising:
determining whether the size of the unavailable portions of the content is smaller than a predetermined threshold; and
in response to determining that the size of the unavailable portions of the content is smaller than the predetermined threshold, requesting to download the entire unavailable portions of the content to the target peer instead of downloading the unavailable portions in sequential pieces based on the file sharing protocol.

8. A computing device for downloading content located on a server to a target peer in a peer-to-peer network, each peer comprising a computing device containing a client executing thereon for enabling sharing of content among the peers according to a peer-to-peer file sharing protocol, comprising:
at least one processor; and
memory including instructions that, when executed by the at least one processor, cause the computing device to perform the steps of:
identifying peers in the peer-to-peer network containing portions of the content;
establishing a virtual peer, the virtual peer appearing as an additional peer in the peer-to-peer network, wherein the virtual peer is configured such that when a particular peer downloads data from the virtual peer, the data is conveyed from the server to the particular peer;
identifying portions of the content that are unavailable on all peers but are available on the server;
marking the identified unavailable portions of the content as available on the virtual peer;
marking portions of the content that are available on any peers as missing on the virtual peer; and
downloading the content to the target peer from the identified peers and the virtual peer based on the peer-to-peer file sharing protocol by obtaining portions of the content available on the identified peers from the identified peers and portions of the content available on the virtual peer from the central server.

9. The computing device of claim 8, wherein the memory further includes instructions that when executed by the at least one processor, cause the computing device to perform the steps of:
identifying one or more additional peers requesting to download the content;
determining a plurality of parts of the unavailable portions of the content; and
downloading from the virtual peer a different part of the plurality of parts to each of the requesting peers in the peer-to-peer network.

10. The computing device of claim 9, wherein the plurality of parts are determined by sequentially dividing the unavailable portions of the content into parts of a number of consecutive chunks.

11. The computing device of claim 9, wherein the plurality of parts are determined by randomly selecting parts of a number of consecutive chunks from the unavailable portions of the content.

12. The computing device of claim 8, wherein the memory further includes instructions that when executed by the at least one processor, cause the computing device to perform the steps of:
determining that additional portions of the content have become available on the peers in the peer-to-peer network; and
in response, marking the additional portions of the content as missing on the virtual peer, such that the virtual peer makes available for download only the portions of the content that are available on the central server and not available on any other peer in the peer-to-peer network.

13. The computing device of claim 12, wherein the memory further includes instructions that when executed by the at least one processor, cause the computing device to perform the steps of:
implementing the BitTorrent peer-to-peer file sharing protocol to download the content to the target peer from the peers in the peer-to-peer network and from the virtual peer.

14. The computing device of claim 8, wherein the memory further includes instructions that when executed by the at least one processor, cause the computing device to perform the steps of:
determining whether the size of the unavailable portions of the content is smaller than a predetermined threshold; and
in response to determining that the size of the unavailable portions of the content is smaller than the predetermined threshold, requesting to download the entire unavailable portions of the content to the target peer instead of downloading the unavailable portions in sequential pieces based on the file sharing protocol.

15. A non-transitory computer readable storage medium for downloading content located on a server to a target peer in a peer-to-peer network, each peer comprising a computing device containing a client executing thereon for enabling sharing of content among the peers according to a peer-to-peer file sharing protocol, comprising one or more sequences of instructions, the instructions when executed by one or more processors causing the one or more processors to execute the operations of:

identifying peers in the peer-to-peer network containing portions of the content;

establishing a virtual peer, the virtual peer appearing as an additional peer in the peer-to-peer network, wherein the virtual peer is configured such that when a particular peer downloads data from the virtual peer, the data is conveyed from the server to the particular peer;

identifying portions of the content that are unavailable on all peers but are available on the server;

marking the identified unavailable portions of the content as available on the virtual peer;

marking portions of the content that are available on any peers as missing on the virtual peer; and downloading the content to the target peer from the identified peers and the virtual peer based on the peer-to-peer file sharing protocol by obtaining portions of the content available on the identified peers from the identified peers and portions of the content available on the virtual peer from the central server.

16. The non-transitory computer readable storage medium of claim 15, further comprising instructions that when executed by the one or more processors cause the one or more processors to execute the operations of:

identifying one or more additional peers requesting to download the content;

determining a plurality of parts of the unavailable portions of the content; and downloading from the virtual peer a different part of the plurality of parts to each of the requesting peers in the peer-to-peer network.

17. The non-transitory computer readable storage medium of claim 16, wherein the plurality of parts are determined by sequentially dividing the unavailable portions of the content into parts of a number of consecutive chunks.

18. The non-transitory computer readable storage medium of claim 16, wherein the plurality of parts are determined by randomly selecting parts of a number of consecutive chunks from the unavailable portions of the content.

19. The non-transitory computer readable storage medium of claim 15, further comprising instructions that when executed by the one or more processors cause the one or more processors to execute the operations of:

determining that additional portions of the content have become available on the peers in the peer-to-peer network; and in response, marking the additional portions of the content as missing on the virtual peer, such that the virtual peer makes available for download only the portions of the content that are available on the central server and not available on any other peer in the peer-to-peer network.

20. The non-transitory computer readable storage medium of claim 19, further comprising instructions that when executed by the one or more processors cause the one or more processors to execute the operations of:

implementing the BitTorrent peer-to-peer file sharing protocol to download the content to the target peer from the peers in the peer-to-peer network and from the virtual peer.

\* \* \* \* \*